April 27, 1965 W. B. HORTON 3,180,687
METHODS AND APPARATUS FOR WIRE SAWING AND WIRE SIZING KERFS
Filed May 19, 1961 7 Sheets-Sheet 1

Inventor
William B. Horton
by Munn F. Hamilton
Attorney

April 27, 1965 W. B. HORTON 3,180,637
METHODS AND APPARATUS FOR WIRE SAWING AND WIRE SIZING KERFS
Filed May 19, 1961 7 Sheets-Sheet 2

Inventor
William B. Horton
by
Attorney

3,180,687
METHODS AND APPARATUS FOR WIRE SAWING AND WIRE SIZING KERFS
William B. Horton, Concord, Mass., assignor to H. E. Fletcher Co., West Chelmsford, Mass., a corporation of Massachusetts
Filed May 19, 1961, Ser. No. 111,281
5 Claims. (Cl. 299—15)

This invention relates to a method and apparatus for wire sawing mineral bodies, reference being had to the operation of forming relatively deep cuts or kerfs in connection with quarrying and processing granite and similar rock bodies. In such an operation a slurry of loose abrasive is continuously forced against the rock by an endless wire saw in which a working tension is maintained. Abrasive action of the wire and slurry forms a kerf. After a time, however, the wire saw may itself become badly worn from this abrasive action.

It is a chief object of the invention to provide a method and means for replacing worn wire with a wire saw body of a standard size in order to maintain the sawing apparatus in a satisfactory running condition.

It will be readily understood that a normal required working tension in a saw system is of an appreciable magnitude and as a worn wire saw decreases in its cross sectional dimension from constant attrition with abrasives and stone, it tends to grow weaker and is less capable of sustaining this working tension. However, the kerf which is produced by a wire saw whose cross sectional dimension is constantly decreasing grows smaller and smaller. When these conditions are allowed to continue too far a point is reached at which the tensile strength of the wire is exceeded and breaking occurs.

Unsuccessful attempts have been made by those skilled in the art to join a standard size wire onto the end of the worn wire and lead the larger wire into the kerf. This fails either because the kerf of decreased size will not accept the wire at all, or it engages the saw with excessive frictional forces which cause breaking of the wire. Thus there is present a constant problem in maintaining a wire saw in a satisfactory running condition.

In an earlier invention relating to a method of wire sawing, described and claimed in Patent No. 2,860,862, issued to me on November 18, 1958, one satisfactory method is disclosed for enlarging or sizing a kerf in a rock body to take a standard size wire. Operation of this patented method is based on employing a helically formed wire saw and is quite satisfactory for some types of operations.

In certain instances of wire sawing, however, where very long cuts are required, a non-uniformity in the size of the cut may occur owing to a variation in tension in the helical wire. This may, in turn, result in undesirable irregularities in the sawed surface of the rock. For example, if excessive tension develops in a helically formed saw as it is being drawn through a very long kerf, the helically formed wire may become extended undesirably. In such cases it becomes more difficult to control the cutting speed of the wire and excessive cutting into the rock may take place at that side of the kerf where the wire saw enters.

The need for more adequately dealing with these problems of non-uniformity of cut and replacement of worn saw bodies has prompted a new concept of kerf sizing not heretofore known as far as I am aware.

I have discovered that it is possible to run a special type sizing saw well within the tensile strength limitations of the sizing wire and yet accomplish progressively increasing grinding action so that a desired enlargement may be ultimately realized whereby a standard size saw can be accommodated.

The key to this novel step is, I find, in engaging a kerf surface with a sizing saw of a generally tapered construction whose increase in diameter is exceedingly attenuated to an almost imperceptible degree.

In my improved method I form a kerf in a rock structure in the conventional manner by a working wire and continue the kerf-forming operation until the working wire is worn to a point where the dimension of the kerf cut in the rock structure has reached a smaller dimension than the initial cut and a replacement of the working wire is desirable. The working wire is gradually reduced in diameter due to friction and not only provides a kerf of reduced diameter so that a new working wire of the same initial dimension cannot be substituted therefor, but the worn wire itself must be replaced because it is subject to rupture due to tension from forces applied to provide its cutting movement thorugh the rock structure. To replace the worn working wire with a new working wire of the same initial dimension, I lead into one side of the bottom of the kerf a tapered kerf sizing saw having an end portion whose diameter is smaller than the width of the reduced kerf at its lowest point in the rock. I then advance intermediate sizing saw portions of gradually increasing diameter against adjacent kerf surfaces, in the presence of an abrasive slurry, to produce abrading forces whose frictional resistance to forward travel is continuously maintained at a value less than the tensile strength of the saw and the dimension of the kerf is appropriately increased to the dimension of the initial cut in the rock structure at which time the working wire was at its maximum dimension. The replacement working wire can then be inserted at the bottom of the kerf.

I have further conceived of a unique means of carrying out my method of kerf sizing based on the idea of setting up two saw systems in such relationship that they may be readily connected to one another. One of these is essentially a "standard" wire sawing system and the other may be referred to as a "standby" wire system. In my new method the worn wire in a conventional sawing system, while still in a fully extended position in a kerf, is connected to the sizing wire in the standby system. When thus connected both systems may be moved as a single unit.

The standby system includes a specially constructed saw body which may be defined as a kerf sizing loop and which is formed of a gradually increasing diameter occurring substantially throughout its length. That portion of the kerf sizing saw having the smallest cross sectional dimension is of a magnitude such that it may be readily drawn into the kerf, and the opposite end of the loop is of a dimension roughly corresponding to or exceeding the cross sectional dimension of a standard size wire saw of, for example, .200 inch.

In one preferred embodiment of the method of the invention, I first form a kerf in a rock body in the usual manner. I then engage one side of the kerf with the relatively small end of a tapered kerf sizing saw which may, for example, consist of successive lengths of wire of progressively increasing diameter joined together to form an elongated cutting body of graduated taper.

Thereafter, tension forces are continuously exerted on the kerf sizing saw to advance the successive lengths through the kerf in the presence of an abrasive slurry so as to remove small particles of the rock body in successive stages. The removal of particles is regulated by controlling the rate of increase in diameter of the successive lengths.

I have further determined that by providing in the standby system a replacement loop which can, at a suitable point, be connected between the worn wire loop and the kerf sizing loop, I am enabled to substitute the replacement loop in place of the kerf sizing loop in one continuous step. As the kerf sizing loop advances, the replacement loop of fresh wire follows the kerf sizing loop into the kerf so that when the kerf sizing loop has completed its sizing function, the replacement loop is located in a fully advanced position in the kerf ready to renew sawing.

At this point both the used wire and the kerf sizing wire are entirely removed from the kerf and may be led off and separated from the length of replacement wire. The opposite ends of the replacement loop may then be joined and normal sawing renewed. The kerf sizing loop is led back into the standby system and held in a suitable position thereafter to be used for the next kerf sizing operation which becomes necessary.

The standby system also includes a special builder sheave arrangement by means of which both the kerf sizing loop and the replacement loop may be handled in a unique manner whenever it becomes necessary to renew the sawing wire. The builder sheave means is constructed and arranged to increase temporarily wire carrying capacity so that the working loop may be joined to both the kerf sizing loop and to the replacement loop and all three of these loop portions may be moved as one integrated wire system through a distance which permits kerf sizing followed by wire replacement.

The nature of the invention and its objects and other novel features will be more fully understood and appreciated from the following description of preferred embodiments of the invention selected for purposes of illustration as shown in the accompanying drawings, in which.

In practicing the method of the invention, two operations may be involved, namely, kerf sizing and wire replacement, as noted above. Kerf sizing with a tapered wire may, if desired, be carried out independently of the step of wire replacement. However, in a preferred embodiment of the invention both operations are carried out in one continuous sequence of movements and the drawings are intended to illustrate this preferred mode of operation with it being understood that the invention is not limited to this specific way of practicing the invention.

Figure 1:
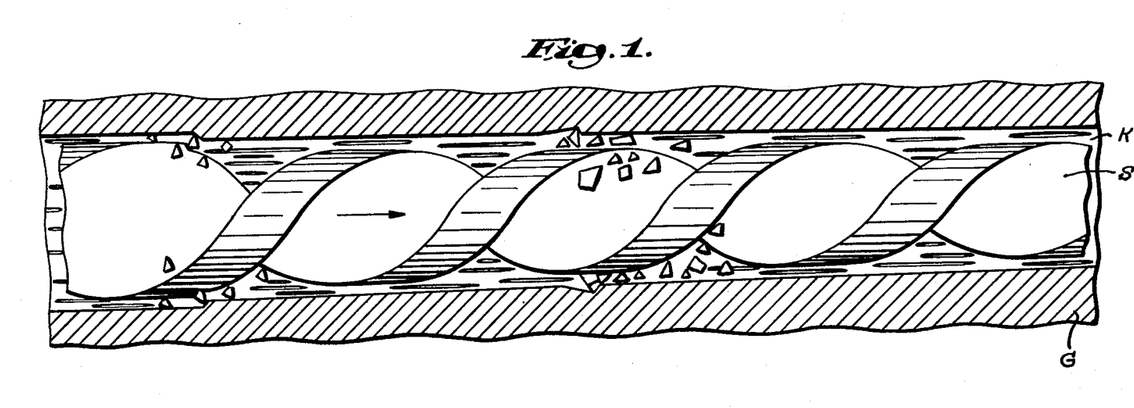
FIG. 1 is a diagrammatic view looking directly into a kerf and illustrating the kerf sizing saw of the invention on an enlarged scale and further showing tapered sections of the saw engaging a typical kerf in a rock body in the presence of an abrasive slurry.

Attention is first directed to FIG. 1 in which I have illustrated a mineral body, such as granite, which is denoted by the reference character G and which is a common type of mineral substance desired to be cut by a wire saw. K indicates a kerf which although first cut by a standard size saw of an original diameter, for example, of .200 inch diameter has gradually become decreased in width due to the fact that the saw itself has worn down to a diameter of .112, for example.

I have also indicated in FIG. 1 on a greatly enlarged scale the special kerf sizing saw S of the invention in a working position in the kerf for carrying out a novel grinding operation of the invention whereby the kerf K may be enlarged.

Figure 3:
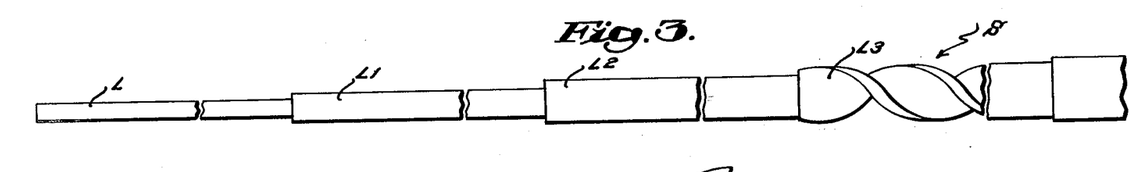
FIG. 3 is a fragmentary elevational view illustrating a plurality of lengths of wire of progressively reduced diameter joined together to form a kerf sizing loop.

In FIG. 3 the kerf sizing member S is indicated fragmentarily in more detail and, as noted therein, is in one preferred form constructed from a plurality of lengths of wire L, L1, L2, L3, etc. The several lengths preferably consist of a helical wire, each length being of a different cross sectional dimension or diameter. The several lengths are joined to one another by some suitable means as, for example, by silver soldering to provide saw sections of increasing diameters.

There is in this way provided a tapered wire member of considerable length of, for example, 5,000 feet up to 5,500 feet, or longer, as used in one typical wire sawing operation. It is pointed out that in this form of sizing saw where a plurality of lengths are joined there is realized a taper in which increase in diameter actually occur in stages or steps. After the sizing saw runs in a kerf the points of junction smooth out to a substantially smooth taper. I may also desire to form a generally similar tapered sizing saw member in other ways, for example, by running a constant diameter wire between grinding surfaces or by forming the wire member by a swaging process.

As noted above the kerf K of FIG. 1 is intended to be representative of a saw cut which has been made with a conventional wire saw system and which has been extended to a point where the wire has become worn undesirably and the kerf itself is of a cross sectional dimension substantially less than the original cross sectional dimension of a standard size saw which has not been in use. For example, the kerf K, shown in FIG. 1, may have a width of .120 to .130 inch resulting from the standard saw having been worn from a diameter of .200 down to a diameter of .110, for example.

In building the sizing saw S from the several lengths as L, L1, L2, L3, etc., I start with a saw wire of a diameter, for example, of .110 inch. This may be conveniently comprised by a worn saw wire taken from the system which has been in operation. It is measured by taking a series of micrometer readings and then averaging these readings. This wire portion may, for example, be constituted by a length L which can be of a section of the smallest end of the wire sizing saw S.

I then select another length of wire L1 of larger diameter. This increase in diameter, I find, must be very small. For example, the diameter should not exceed .010 of an inch to avoid danger of creating a resistance in excess of the tensile strength of the wire having regard for a subsequent application of tension which will actuate the sizing saw. A satisfactory diameter of L1 may be approximately .121 of an inch assuming that length L is of .112 inch, which provides an increase of .009 inch in diameter approximately.

Longitudinal dimensions for the lengths L and L1 must be great enough to cooperate with the increase in diameter and produce an appreciable grinding effect in kerf K and such dimensions have been determined by tests in typical kerf sizing operations. It is found that by utilizing 40 to 50 feet of wire for each .001 inch change in diameter an appreciable cut may be obtained without exceeding the tensile strength of the wire. Therefore, for a .010 increase in diameter a span of approximately 400 to 500 feet of wire is required in each length. These lengths L and L1 thus determined are then joined together as by silver soldering of well known nature.

Additional lengths L2, L3, L4, etc. of similar magnitude and relatively increased diameter are then combined with the joined lengths L1 and L2 until there is obtained a total length of approximately 5,000 to 5,500 feet of kerf sizing wire. For this amount of wire it will be seen that roughly ten lengths may be required. It will also be observed that the change in diameter is exceedingly attenuated being, in one preferred form, of an order of magnitude of about .00002 inch per foot of sizing wire.

In the preferred method of constructing the sizing wire loop of the invention, it is not only convenient to employ sections of worn wire from an existing wire saw system, but it is also convenient to support the sizing loop in close proximity to the sawing wire which is used in carrying out the conventional sawing operation. For instance, the joined lengths removed from the conventional sawing wire can be drawn over sheaves mounted near sheaves which support the conventional sawing system and there may in this way be comprised a standby sizing system which can be readily connected to portions of the conventional wire system whenever this is desired.

Figure 11:
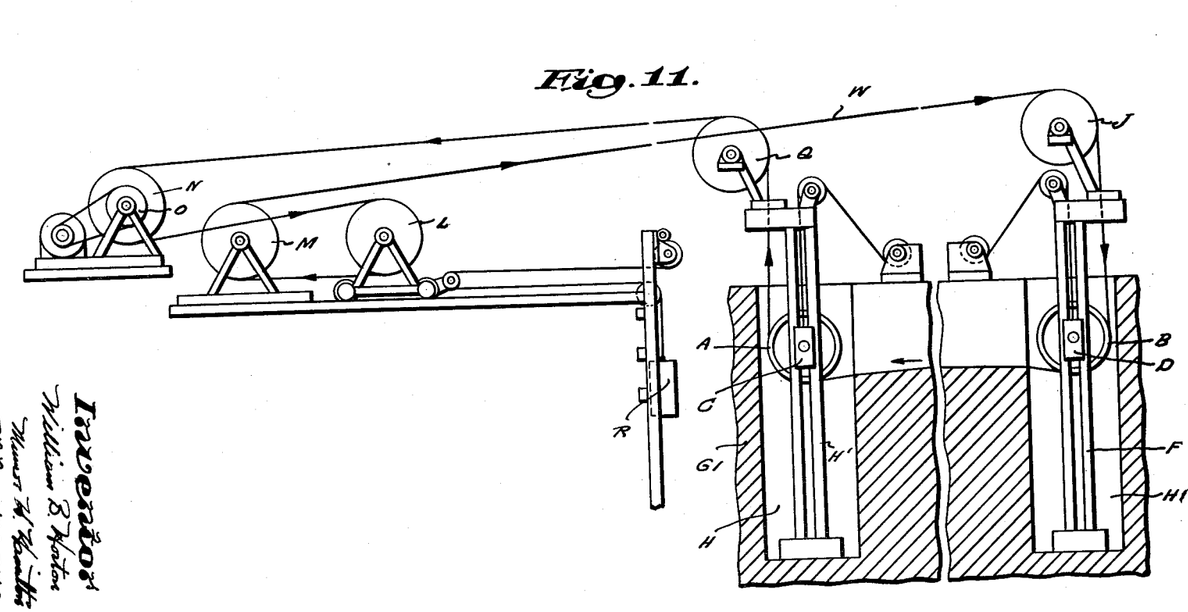
FIG. 11 is a diagrammatic view illustrating in side elevation portions of a wire sawing apparatus operating on a body of granite.
Figure 12:
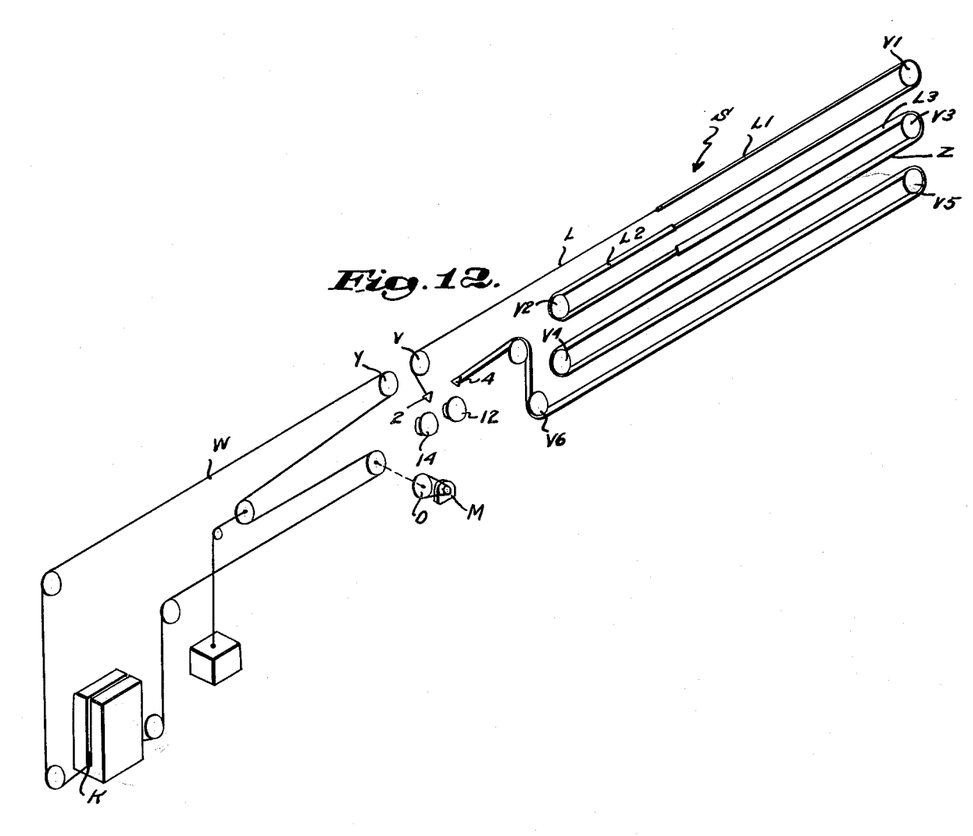
FIG. 12 is a diagrammatic view illustrating a kerf sizing loop in a position to be combined with a used wire sawing system illustrated in FIG. 11.

I have also found that by arranging the standby system in this relationship it also becomes possible to draw off portions of worn wire from the sawing wire system from time to time so as to connect such worn portions to the sizing loop whenever it is desirable to replace sections of the sizing wire itself. FIG. 11 illustrates in some detail a conventional form of wire saw system such as is employed to form the kerf K in FIG. 1 prior to engagement of the kerf sizing wire S therein. This same conventional wire saw system is also illustrated more diagrammatically at the left hand side of FIG. 12, while at the right hand side of FIG. 12 is indicated a preferred form of standby system of the invention. FIGS. 13–18 inclusive illustrate diagrammatically successive steps in using the standby system of FIG. 12 to carry out kerf sizing and wire replacement.

Figures 4, 7:
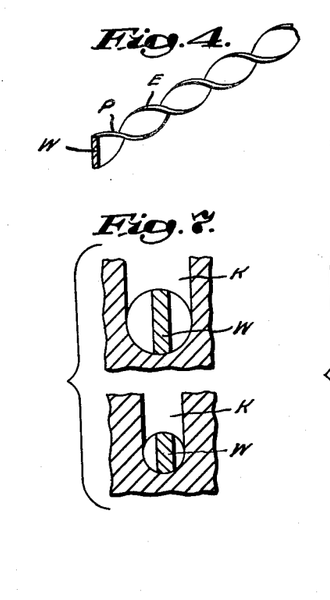
FIGS. 4, 5 and 6 are fragmentary perspective views showing several different forms of wire of the type employed in the invention.
FIGS. 7, 8 and 9 are cross sectional views illustrating saws of the form shown in FIGS. 4, 5 and 6 respectively in a kerf in a cutting position.

As shown in FIG. 11 a conventional form of wire saw apparatus includes an endless loop of wire W which, in a preferred form, is of twisted or helical form as shown, for example, in FIG. 4. The wire may also be formed from two strands twisted about one another as shown by wire W1 in FIG. 5, or three strands as shown by wire W2 in FIG. 6.

Figures 5, 6, 8, 9:
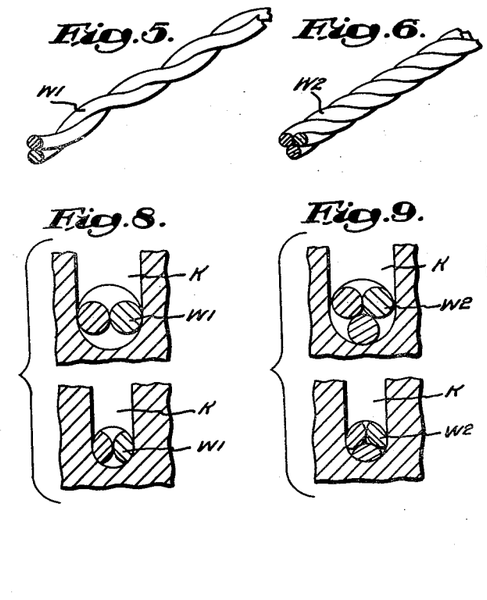

In all of these forms of helically formed wire, it will be observed that there are present helical edges E spaced to provide pockets P occurring between the edges. In a typical sawing operation these pockets function to hold abrasive particles and force them against a stone surface. In practice a slurry of loose particles is continuously fed into the granite surfaces of a kerf and a continuous grinding action takes place to cut a kerf deeper and deeper in a rock body.

As indicated in FIG. 11 the wire W is held in a cutting position with respect to the body of granite G1 by means of sawing sheaves A and B rotatably mounted on vertically adjustable bearings C and D. The bearings are slidably received in vertical channel members H', F, mounted in holes H, H1. The wire W is guided in the direction indicated by the arrows over sheaves as Q and J, and a motor driven sheave O furnishes driving power. The sheaves M and L are arranged to exert tension on the wire in response to the pull of a weight R. Further details of this saw apparatus are described in Patent No. 2,860,862 noted above.

In accordance with the invention I combine with this conventional sawing system the standby system of the invention as shown in the right hand side of FIG. 12 and indicated in more detail in FIGS. 13 to 18 inclusive. Included in this standby system is a conventional number of building sheaves, as sheaves V, V1, V2, V3, V4, V5 and V6. These sheaves are rotatably mounted on a suitable sheave frame which may be of any conventional nature and such as has been suggested in FIG. 11 and which is not shown in the drawings.

Supported on these building sheaves is the kerf sizing loop S which, as noted above, is made up of a plurality of sections of wire L, L1, L2, L3, etc. Preferably the sheave V is located in close proximity to a sheave Y in the conventional sawing system at the left hand side of FIG. 12. Another sheave V1 is arranged in a rearwardly located position to guide the length L along a straight line of travel which coincides close with the line of travel or wire W as noted in FIG. 12.

The lengths L, L1, L2, L3, etc. are reeved about the sheaves V, V1, V2, V3. Also attached to the kerf sizing loop S is a replacement loop Z, portions of which are shown mounted around the sheaves V4, V5 and V6. One end of sizing loop S may be secured to an end of loop Z and the other end of loop S may be held in a clamp 2. The remaining end of replacement loop Z is similarly secured in a clamp 4.

It will be apparent that this standby system may be held in the position described during the period that a sawing operation is taken place. Assuming, however, a kerf sizing operation becomes desirable then the standby system is employed in the following manner.

Figures 13, 14, 15:
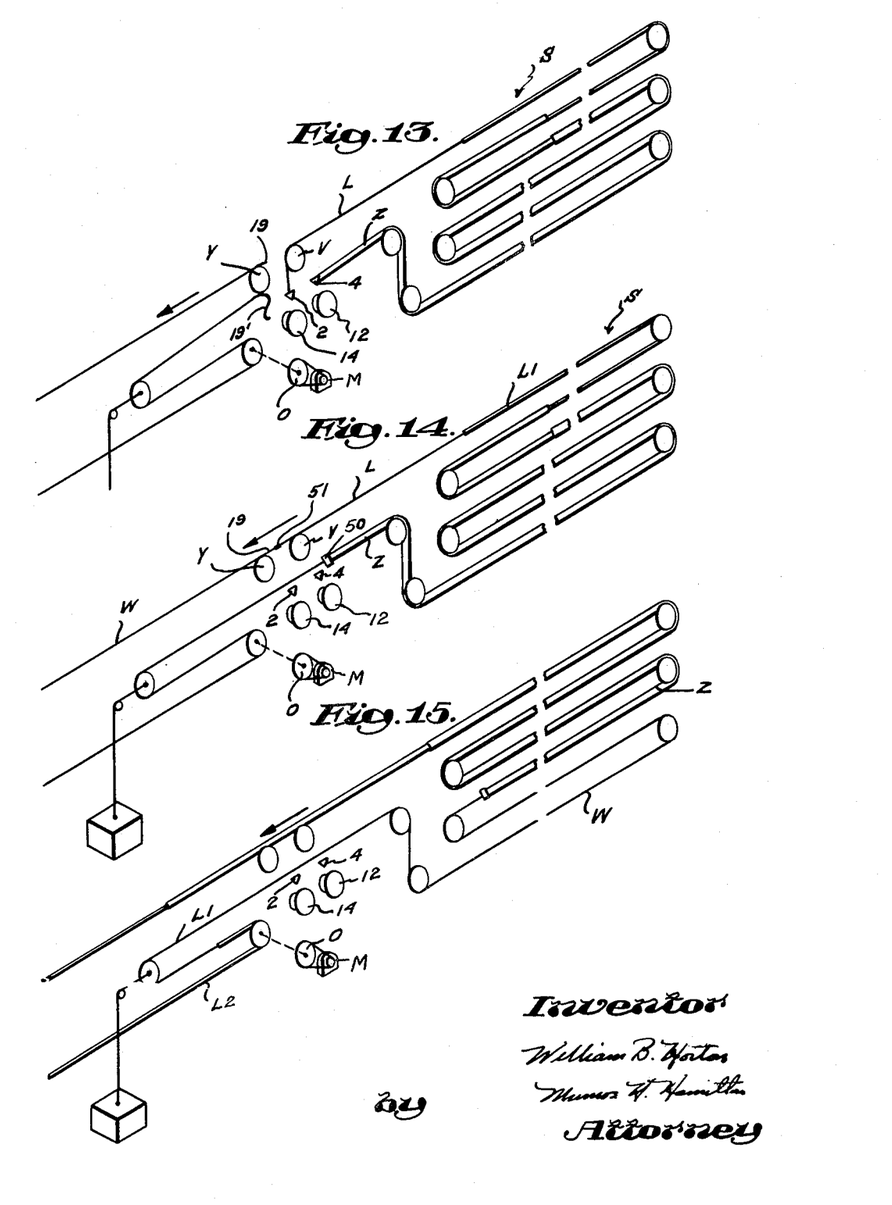
FIGS. 13–18 are diagrammatic views illustrating various positions of use of the kerf sizing saw.

First the motor M is stopped and the wire W is allowed to come to rest. Thhe loop W is then cut to form ends 19 and 19' (FIG. 13). The upper end of length L of member S is removed from clamp 2 and soldered to the end 19 of the wire W, as suggested in FIG. 14 and the joined sections are then supported over sheaves Y and V.

Next the clamped end of replacement loop Z is removed from clamp 4 and joined by soldering to the remaining end 19' of the wire W, also shown in FIG. 14. The two systems are thus joined into one endless loop as seen in FIG. 14. It may also be desired to have the point of junction of the replacement loop Z with the worn wire W marked by a flag 50. Similarly, the joint of the worn wire W and the sizing wire S may be marked with paint or other material as at 51.

The system is now put in motion by operation of the motor driven pulley O and then the combined sawing system and standby system moves in the direction of the arrows as shown in FIGS. 14 and 15. The small end of the sizing saw S is led forwardly and begins to engage in the sides of the kerf. In co-operation with the abrasive slurry the sizing saw gradually increases the width of the kerf as it moves therethrough.

An important feature of the invention is the manner in which the lengths of the kerf sizing loop S cooperate with a slurry of loose abrasive to carry out abrading or grinding action. When the small end of the helical sizing loop enters the kerf, there is a small clearance present. This clearance is not great enough for relatively large particles of abrasives to get under the grinding edges so these particles ride along the saw.

However, small particles can get underneath the helical edges. As the particles slide along they tip over and jam in the clearances described above. Being non-spherical some particles have a dimension which exceeds their other dimensions. As they tip over and present a greater dimension than the clearance in which they are retained they forcibly abrade the side of the kerf and thereby enlarge the clearance. This permits larger particles from the pockets to enter the clearance which, in the same manner, enlarges it further.

At the same time, the periodically changing dimension or taper of the saw causes the grinding edges thereof to advance against the sides of the kerf. Thus, a progressive grinding is carried out in a continuous manner as long as the saw is running, with successive lengths of progressively larger cross sectional dimension exerting a highly concentrated grinding action not heretofore realized.

Figure 2:
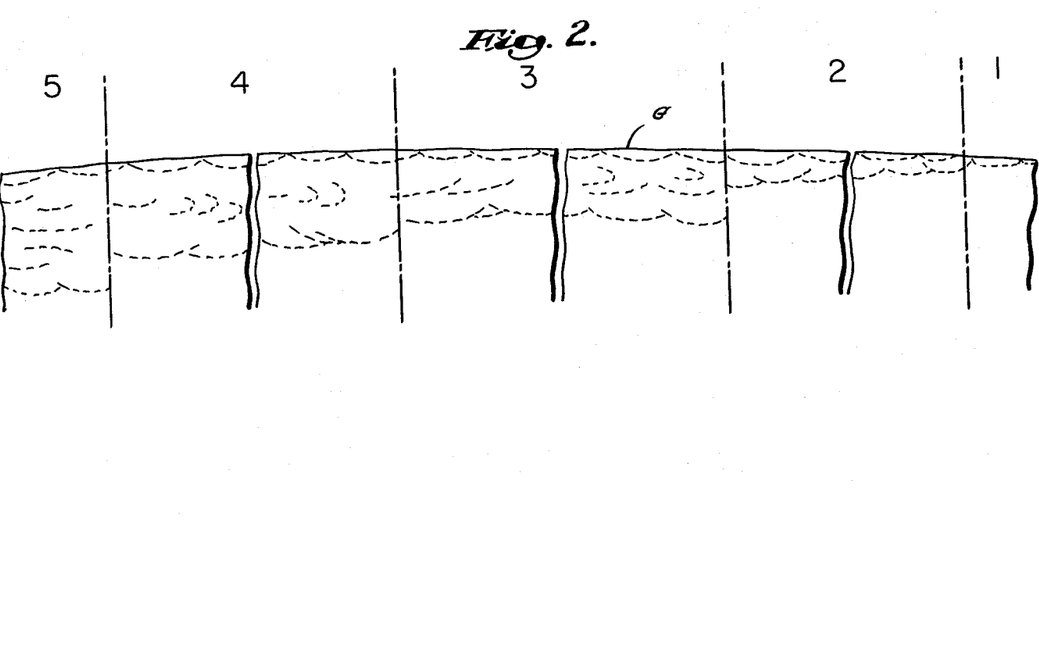
FIG. 2 is another diagrammatic view illustrating stages in removing successive portions of rock along a kerf.
Figure 10:
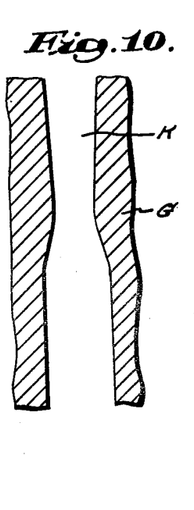
FIG. 10 is a detail cross sectional view illustrating a saw kerf enlarged by the kerf sizing saw of the invention.

This gradual process of abrading has been indicated diagrammatically in FIG. 2 of the drawings wherein the dotted lines show chips of granite progressively removed to widen a kerf using the sizing saw of the invention. The granite body G has been divided into sections 1, 2, 3, 4, 5 to show the progressive removal of chips accomplished by increasing the diameter of five successive lengths of the sizing saw. FIGS. 7, 8 and 9 illustrate narrowing of kerfs as the saw wires wear. FIG. 10 is intended to illustrate the enlargement of a kerf as practiced by the method of this invention.

When the sizing saw has completely passed through the kerf the replacement loop Z is drawn into the resulting enlarged kerf. At the same time the worn wire W becomes drawn into the standby portion of the circuit on the sheaves V6, V5, etc. FIG. 15 shows the sizing saw in process and FIG. 16 shows the replacement loop Z in a position in which it has replaced the sizing saw.

Figures 16, 17, 18:
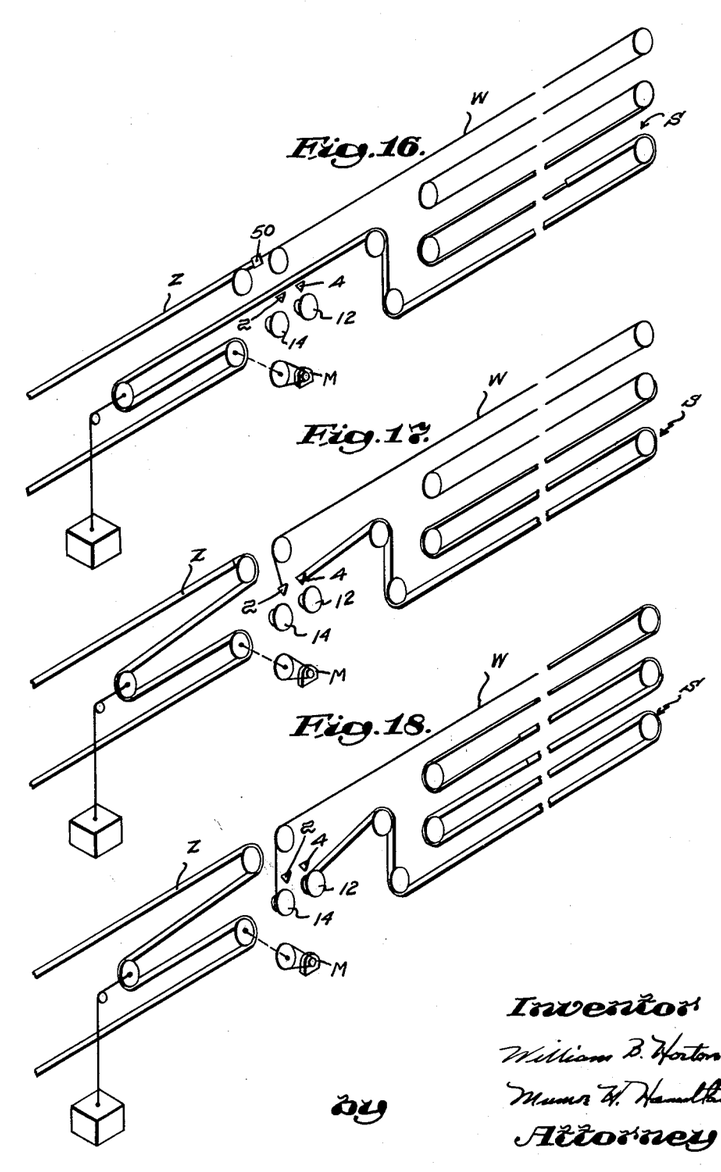

As the replacement loop Z is moved into the kerf, the sizing loop S also becomes drawn into the standby system as suggested diagrammatically in FIG. 16. At one point the flag 50 previously attached to the end of the new wire will approach the point where the two systems join. At this time the operator stops the motor M. The operator next cuts the loop in two places so that the new sawing loop may be restored to its original length and made endless. The first cut is made at the flag 50 which marks one end of the new wire. The other cut is made at the junction of the sizing wire with the opposite end of the new wire. This operation is indicated diagrammatically in FIG. 17. When these two ends of the new wire are joined together, the new saw loop is ready to be put into operation. This stage is suggested diagrammatically in FIG. 18.

The function of the standby system is now completed to provide a sawing loop of new wire and nothing more in this stage need be done. The ends of the standby circuit may be left held in the clamp 2 and 4 as shown in FIG. 18.

However, before the operation is repeated, it is necessary to fill the standby circuit with new wire. To do this, the end of worn wire is taken from clamp 2, and attached to a take-up spool 14 for worn wire W. The thick end of the wire sizing saw S held in clamp 4 is soldered to the end of a spool 12 of new wire. The spools are then turned, drawing worn wire out of the circuit and feeding in new wire. This process is shown in FIG. 18.

When all the worn wire is spooled out of the standby circuit, and the thin end of the broach, previously marked with paint, reaches the spool 14, the member S is examined for wear, and if the end is too thin an adequate amount is spooled out of the circuit and cut off. In this way the thin end of sizing saw S may be removed and an equal amount of new wire will automatically be added to its thick end, in a most convenient manner.

When a desired point has been determined to form the new thin end of the sizing saw, a cut is made and the end clamped at 2. The new wire is cut at the spool 12, and clamped at 4. The circuit is now in its original position to complete another cycle of reaming, as shown in FIG. 12.

It will be observed that the process described will measure off exactly enough new wire to replace wire W of FIG. 12 plus the amount desired to restore wear in the broach. Thus no excess new wire is spooled off until it is wanted, and a most convenient means is provided for maintaining the sizing saw which necessarily wears from repeated use. Therefore, once a sizing loop has been constructed and put into use, although its metal wears, the sizing loop never wears out.

It will also be noted that the driving motor M of the saw circuit is used to do the reaming and pull the new wire into the circuit. No additional power is needed, unless as a convenience it is desired to power roll 14 for spooling out worn wire. Furthermore, the reaming operation may be done at the same motor speed as the sawing operation and no provision for a two-speed drive is necessary. However, I have found that if motor M can be throttled to a lower speed, then the enlarged circuit is more smoothly driven.

Figure 19:
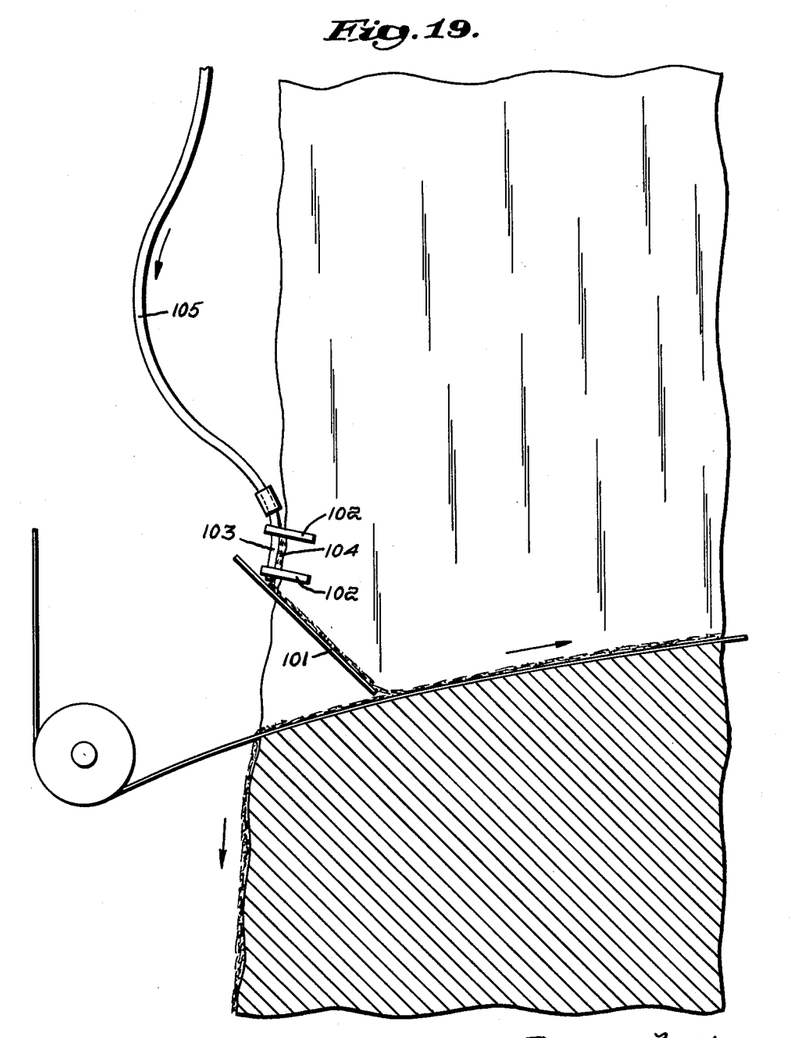
FIG. 19 is a diagrammatic view illustrative of one preferred method and means for feeding an abrasive slurry to a kerf.

The practice of this invention has made completely practical the sawing of tremendous continuous areas of stone. For example, I have made cuts over one hundred feet long and over eighty feet high, with ten wires operating in a gang making ten parallel vertical cuts simultaneously. When making such deep cuts, and also when sizing them for new wire, I have found a novel method and means of feeding the slurry to the cut to be desirable. This is shown diagrammatically in FIG. 19. A thin strip of wood or steel 101 is inserted diagonally into the front of the kerf just above the wire. Immediately above the number 101, fastened by wedges 102, is a slit tube 103, having sponge rubber faces 104 so that the slit is more or less sealed against the face of the stone. The slurry, or wash water when desired, is fed through the hose 105, and enters the kerf through the slit and passes down over the baffle 101 to the wire. By this means the slurry is fed more directly to the wire than it would be if fed down through the kerf for its entire height. Also, the kerf may be kept clear of slurry which can drip down on the wire when it is not desired. Also clean flush water can be more directly fed to the wire when it is desired to do so. Since a controlled feed of abrasive slurry to the wire is particularly important in the sizing operation, I have found this method and device to be particularly useful on very high kerfs, and I use this in conjunction with the preferred form of this invention. Various other changes and modifications may be resorted to within the scope of the appended claims.

I claim:

1. A wire saw apparatus for enlarging a kerf in a rock body which has been cut and which decreases in width from its point of start to its bottom due to wear of the wire saw, said apparatus comprising an endless cutting structure including a worn working wire having a cross-sectional dimension generally corresponding to the width of the kerf at its bottom point, a replacement wire connected at one of its ends to one end of said working wire and having a cross-sectional dimension greater than that of said worn working wire and generally corresponding to the width of said cut at its point of start in said rock body, a tapered kerf sizing saw connected at its ends to the unconnected end of said first worn working wire and the unconnected end of said replacement wire for enlarging the bottom of said kerf, said kerf sizing saw consisting of a plurality of elongated sections joined end to end and having its sections of progressively larger cross-sectional dimension to provide attenuated sizing steps which are graduated from a minimum sized terminal having approximately the cross-sectional dimension of the worn working wire to its other maximum sized terminal portion having a cross-section corresponding to that of the replacement wire, said sizing saw having its terminal portion of minimum cross section connected to an end portion of said working wire and its terminal with its maximum cross section connected to an end portion of the replacement wire, and means for moving the endless cutting structure under tension and for driving and guiding said working wire and said tapered kerf sizing saw entirely through said kerf, whereby said replacement wire is positioned in said enlarged kerf for a further wire sawing operation.

2. A structure according to claim 1 in which the saw apparatus further includes a plurality of separated wire supporting sheave assemblies, one of said sheave assemblies being constructed and arranged to receive the said kerf sizing saw and support the kerf sizing saw in a stored position with its terminal portion of minimum cross section in a suitable position for reentry in the kerf.

3. In a method for replacing a worn wire saw with a new replacement wire of standard size, the steps which include forming a kerf in a rock body with a wire saw until the kerf is reduced in size at its bottom due to reduction in the dimension of the wire because of wear, replacing the worn wire by attaching to the end of the worn wire an integral tapered kerf sizing saw comprising a plurality of joined sections of progressively larger cross-sectional dimension and having one end section smaller than the width of the kerf at its lower point in the rock body and an intermediate portion of gradually increasing diameter with the maximum diameter at least as great as the diameter of a replacement wire, fixing a replacement saw to the free end of said sizing saw, advancing the sizing saw against adjacent kerf surfaces in the presence of an abrasive slurry to produce abrading forces whose frictional resistance to forward travel is continuously maintained at a value less than the tensile strength of the wire, whereby the dimension of the kerf is gradually increased for the entrance of the replacement wire in place of the worn wire.

4. In a method of wire sawing a rock body in which a slurry of abrasive material is forced into frictional engagement with a surface of the rock body by a wire saw member, the steps which include forming a kerf of predetermined length with said saw until the kerf is reduced in size at its bottom due to reduction in the width dimension of the saw because of wear, then moving through the kerf a wire saw body made up of a plurality of lengths of joined wire saw sections, each of said lengths presenting incremental increases in diameter with the first length of joined wire saw sections of slightly less diameter than the diameter of the bottom portion of the kerf, and controlling the magnitude of length and incremental increase in diameter in each section thereby to continuously maintain total friction forces exerted in the kerf by any one of the said sections at a value below the breaking strength of the said joined sections.

5. In a method of wire sawing a rock body in which a slurry of abrasive material is forced into frictional engagement with a surface of the rock body by a wire saw member, the steps which include forming a kerf of predetermined length with said saw until the kerf is reduced in size at its bottom due to reduction in the width dimension of the saw because of wear, and then enlarging the kerf in progressive stages throughout its length by moving therethrough a kerf sizing saw body made of joined sections of wire, each of said sections presenting an incremental increase in diameter with the first length of joined wire saw sections of slightly less diameter than the diameter of the bottom portion of the kerf and each of which incremental increases in diameter are related to the said length of the kerf to continuously maintain frictional forces of resistance exerted in the cut by any one of the sections at a value below the breaking strength of the joined sections.

References Cited by the Examiner
UNITED STATES PATENTS

| | | | |
|---|---|---|---|
| 454,712 | 6/91 | Clark. | |
| 589,199 | 8/97 | Wincgz et al. | 125—21 |
| 1,732,692 | 10/29 | Peiseler | 76—112 |
| 2,158,830 | 5/39 | Newsom. | |
| 2,351,175 | 6/44 | Wilhelm. | |
| 2,775,439 | 12/56 | McCarthy | 175—391 X |
| 2,780,439 | 2/57 | Kandle | 175—391 |
| 2,815,935 | 12/57 | Sedlmayr | 175—391 X |
| 2,860,862 | 11/58 | Horton. | |

BENJAMIN HERSH, *Primary Examiner.*